April 28, 1931.    W. D. MAXIM ET AL    1,802,660
MEANS FOR THE AUTOMATIC CONTROL OF POWER
Filed May 27, 1925

INVENTORS.
W. D. Maxim
E. A. Mahannah
BY
Rogers, Kennedy Campbell
ATTORNEYS.

Patented Apr. 28, 1931

1,802,660

UNITED STATES PATENT OFFICE

WILLIAM D. MAXIM, OF NEW YORK, AND EVERETT A. MAHANNAH, OF NIAGARA FALLS, NEW YORK, ASSIGNORS TO INTERNATIONAL PAPER COMPANY, A CORPORATION OF NEW YORK

MEANS FOR THE AUTOMATIC CONTROL OF POWER

Application filed May 27, 1925. Serial No. 33,262.

At the present time it is the custom for various industrial plants which use large quantities of electric power, to contract for this power at a low rate granted in consideration of the promise to pay for a given amount of power whether used or not, and power used in excess of the amount contracted for is paid for at a materially higher rate than that delivered under contract. Due to the varying load conditions in plants, there is at times electric power which is available but not used, and this unused power goes to waste. It is desirable therefore to make use of such unused power, and it has been the custom to install electric boilers for this purpose, in which the load is in direct proportion to the height of the water on the electrodes within the boiler, and it has been the practice to control this load by manually regulating the amount of feed water entering the boiler, but such means of control have not been found effective to regulate the load sufficiently close to the amount of power available.

It is the aim of the present invention to overcome this objection and to provide reliable and effective controlling means to meet the varying load conditions mentioned, and to this end the invention consists in an improved system of electric control which will operate to totalize the power used for two or more purposes, and which will operate automatically to vary the power used for one purpose to a sufficient extent to compensate for such variable consumption of power for other purposes as occur in the regular operation of the plant. By this means the electric power available by reason of the varying load conditions in the plant, and which would otherwise go to waste and be lost, is made use of in the operation of the plant under conditions which will not require the attention of an attendant to control the application of said power.

In the accompanying drawings the invention is shown by way of example in connection with an electric boiler to utilize the excess of power, and in which the load is automatically regulated according to the variations of the power used in the plant, but it will be understood that the invention is not limited to this particular application and may be applied in connection with other forms of power consumers suitable for converting the excess of power into useful work in the plant.

Figures 1, 2:
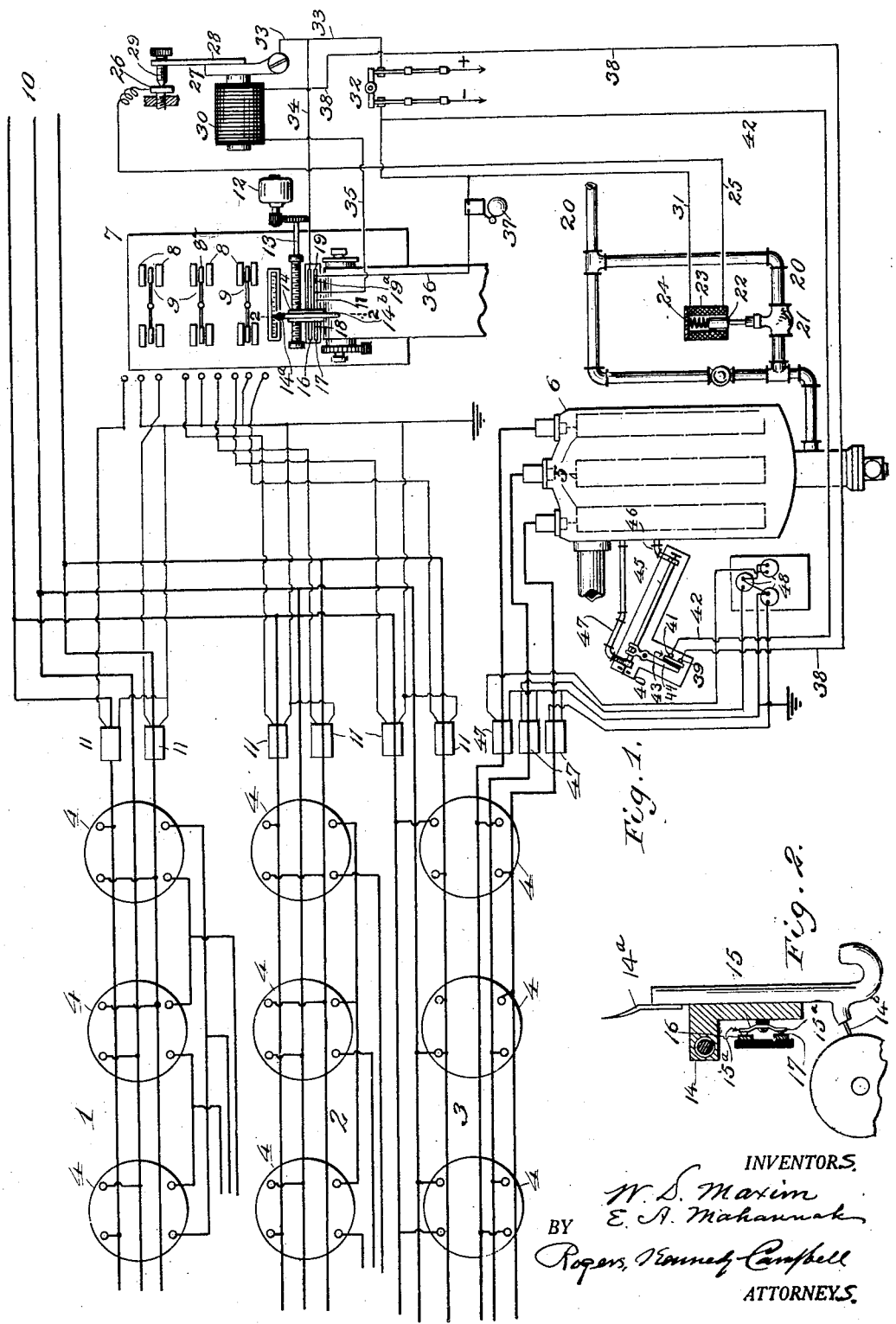
Fig. 1 is a diagrammatic view of the improved controlling system.
Fig. 2 is a vertical section on an enlarged scale of a detail of the same, the section being taken on the line 2—2 of Fig. 1.

Referring to the drawings:

In the specific embodiment of the invention illustrated the reference numerals 1, 2 and 3 designate generally three banks of transformers 4 having their primaries connected to a suitable source of power. The banks 1 and 2 are designed to furnish power to the various electrical equipment such as power consumers of a factory or the like, and the bank 3 has its secondary feeding the electrodes 5 of a power consumer in the form of an electric boiler 6. A graphic totalizing watt-meter 7 of conventional design serves to record the total power used by the three banks of transformers, the potential coils 8 of the meter elements 9 being energized by a potential transformer (not shown) of the proper ratio having its primary connected to the incoming power line 10. The current coils $8^a$ of the meter elements are energized by pairs of current transformers 11 connected in the line feeding the respective banks of transformers. The reference numeral 12 indicates a motor operated in the usual manner by a relay (not shown) which in turn is actuated upon movement of the elements 9 of the meter, the direction of rotation of the motor being determined by the direction of movement of the meter elements in the usual manner. This motor drives the shaft 13 of the watt-meter and imparts motion to the movable member or carriage 14 carrying the pointer $14^a$ and the recording pen $14^b$. On the inner side of the carriage, as best shown in Fig. 2, is secured and insulated therefrom, a short-circuiting contact strip 15, the opposite ends of which are provided with contact points 15ª normally engaging respectively contact strips 16 and 17 mounted on the face of the instrument 7. These strips are insulated from each other, the strip 16 being continuous, while the strip 17 is made up of a long portion 18 and a shorter portion 19 separated from each other by a block of insulating material 19ª. It is evident from the foregoing that electrical connection will be made at all times between the strip 16 and one of the portions of the strip 17, depending upon the position of the carriage, the purpose of which will presently appear.

The electric boiler is supplied with water from a feed water line 20 furnished with a controlling valve 21 whose stem has fixed to it a soft iron plunger 22 surrounded by a solenoid coil 23, the plunger being acted on by a spring 24 which tends to hold the valve closed, and whose force is overcome when the coil is energized, and thereby the valve opened. A conductor 25 leads from one terminal of the coil 23 and is connected at its opposite end to a stationary contact 26 of a single-pole contactor 27 provided with a movable armature 28 furnished with a contact point 29 cooperating with the contact point 26, the said armature being operated by an electric magnet 30. The other terminal of the coil 23 is connected by a conductor 31 to the negative pole of a fused knife switch 32 controlling the supply of power from a direct current line. A conductor 33 leads from the positive pole of the switch to the armature arm 28 of the pole contactor 27.

The conductor strip 16 on the watt-meter before alluded to, is connected by a conductor 34 with the said conductor 33, and the longer portion 18 of the strip 17 is connected by conductor 35 to one of the terminals of the coil of the electromagnet 30. The shorter portion 19 of the conductor strip 17 is connected by a conductor 36 with the conductor 31 before alluded to, and an alarm bell 37 is connected in said conductor 36, the purpose of which will presently appear.

The other terminal of the coil of magnet 30 is connected by a conductor 38 to a contact point 39 of a cut-off or expansion tube mechanism 40, adjacent which contact is a second contact point 41 which is connected by a conductor 42 to the negative pole of the knife switch 32. The circuit through the conductors 38 and 42 is controlled by a contact strip 43 carried by an arm 44 operated by the expansion tube 45, which tube is connected at its opposite ends with the interior of the boiler through the connecting tubes 46 and 47. The arrangement is such that when steam enters the tube 45, the latter will expand and the circuit will be closed through the conductors 38 and 42, and when water enters the tube, the latter will contract and said circuit will be opened.

The operation of the system above described is as follows:

When the total load of the three banks of transformers is of such value that the carriage of the watt-meter is in such position that the conductor strip 16 and the portion 18 of the conductor strip 17 are short circuited, the circuit will be completed through conductor 35 leading from strip 18, through coil 30, conductor 38, contact strip 43, conductor 42, knife switch 32, conductor 33 and conductor 34 connected with strip 16, which will cause the pole contactor 27 to close. The circuit being thus completed through the coil of magnet 30, armature 28 of the pole contactor will be operated and the circuit through the coil 23 operating the valve 21 will be closed through conductor 25 leading from the contact point 26, conductor 31, knife switch 32, conductor 33, armature 28 and contact point 29, and the valve 21 will be opened and water will be admitted to the boiler. As the water rises in the boiler, the resistance between the electrodes 5 is decreased, and consequently the load is increased. This increase of load will cause the carriage 14 of the watt-meter to move to the right until the arm 15 connects the conductor strip 16 with the conductor strip 19 and this will close the circuit through the alarm bell 37, the circuit flowing from conductor strip 19 through conductor 36, alarm bell 37, thence to the knife switch 32, then from the knife switch by conductor 33 to conductor 34, and thence to conductor strip 16. The alarm will be sounded and will indicate that the total power being used by the three banks of transformers is in excess of that contracted for. When the carriage is in this position however the circuit between the conductor strips 16 and 18 is open, and the valve 21 held closed by its spring, which will arrest the flow of water into the boiler and allow the boiler to convert the water already therein into steam, thus reducing the load and permitting the carriage to return to its former position at the left. Thus as long as the total power used by the three banks of transformers is below the contract figure, the valve 21 will remain open, permitting a full volume of water to enter the boiler and be transformed into steam for use in the factory, the load of the boiler being caused to vary in accordance with the variations of power used by the transformer banks 1 and 2, through the agency of the electrical control of the water fed to the boiler.

In the event that the boiler is pumped full of water and the watt-meter still shows a load below the contract value, the expansion tube will function to permit the closing of the valve 21 so as to cut off the feed water until its level is such that the tube is again filled with steam. Overflow of the water from the boiler is thus prevented.

In practice, the mechanism above described maintains the total load substantially constant by the automatic opening and closing of the feed water valve in response to variations in either the plant load or the boiler load.

In order that the attendant may know at all times the amount of load of the electric boiler, ammeters 48 are provided to indicate the amount of current in each phase. These ammeters are connected to three current transformers 47 in the respective conductors leading to the electrodes 5 of the boiler.

In the foregoing description and accompanying drawings we have set forth our invention in the particular detailed form which we prefer to adopt and which in practice has been found to answer to a satisfactory degree the ends to be attained. It is manifest however that the details may be variously changed and modified without departing from the spirit of the invention; and it will be understood that the invention is not limited to any particular form, construction or arrangement of the parts, except in so far as such limitations are specified in the claims.

Having thus described our invention, what we claim is:

1. In a power control system for a plant having a plurality of power consumers supplied with electric power from a common source and subject to varying load, the combination of an electric steam boiler whose load is proportional to the water level therein, means whereby said boiler is supplied with power from said common source, a boiler feed line including a solenoid-operated valve, means for indicating the total amount of power used by said power consumers and boiler, said means including a movable member, a circuit including said solenoid-operated valve acting when completed to open the valve and admit water to the boiler, a circuit including an electrically operated alarm, and means whereby said circuits are closed selectively according to the position of said movable member.

2. In a power control system for a plant having a plurality of main power consumers using variable amounts of power from a common source of alternating current, an auxiliary power consumer in the nature of an electrically heated steam boiler whose power consumption is proportional to the level of water therein, means including a transformer for supplying power to the boiler from said common source, an electro-magnetically operated valve for controlling the supply of feed water to the boiler, a watt-meter for measuring the total power consumption of the main power consumers and the auxiliary power consumer, a circuit including said electro-magnetically operated valve acting when completed to open the valve and admit water to the boiler, and a switch associated with and operated by said watt-meter to control said circuit.

In testimony whereof, I have affixed my signature hereto.

WILLIAM D. MAXIM.

In testimony whereof, I have affixed my signature hereto.

EVERETT A. MAHANNAH.